United States Patent Office 3,515,486
Patented June 2, 1970

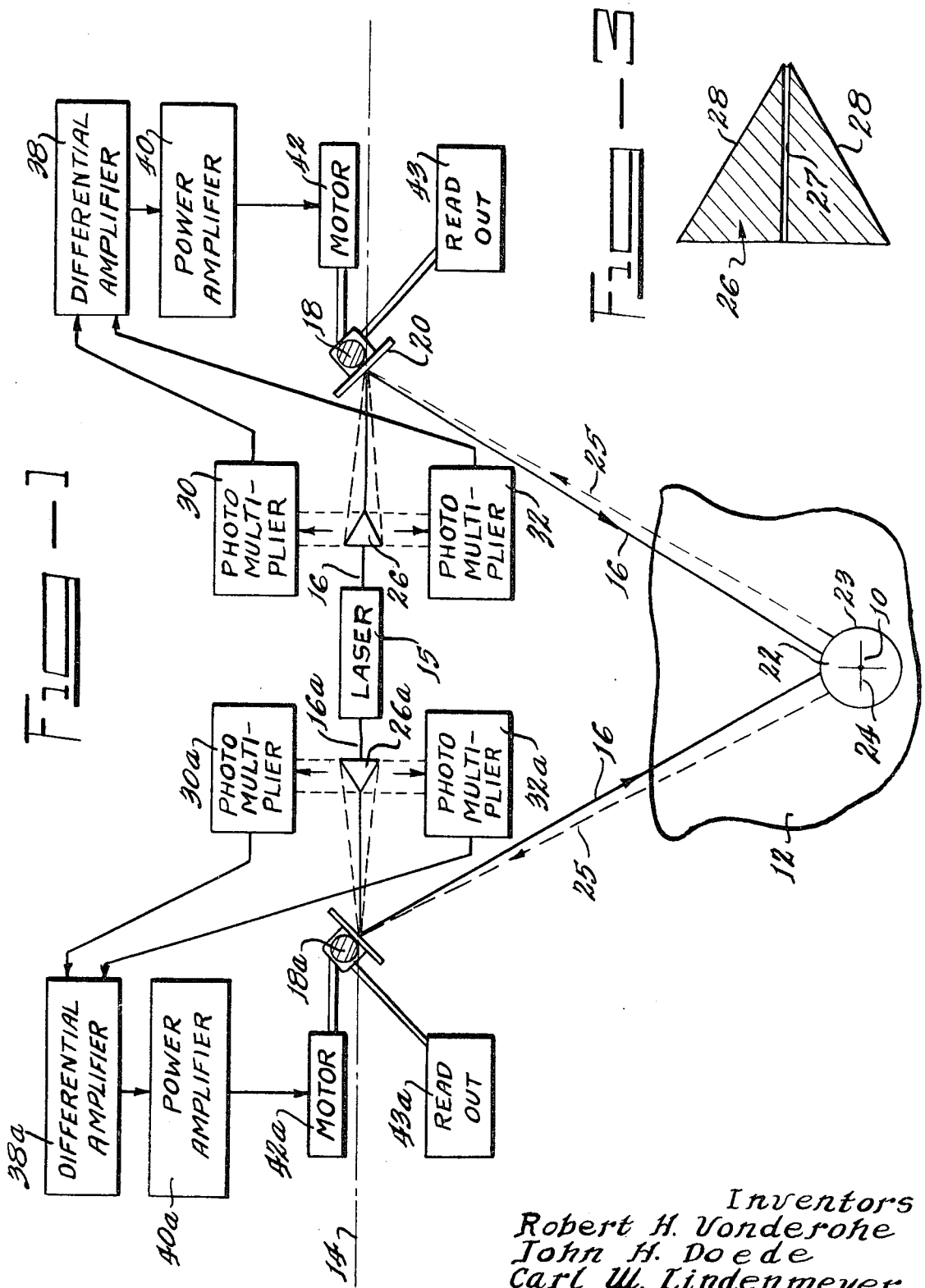

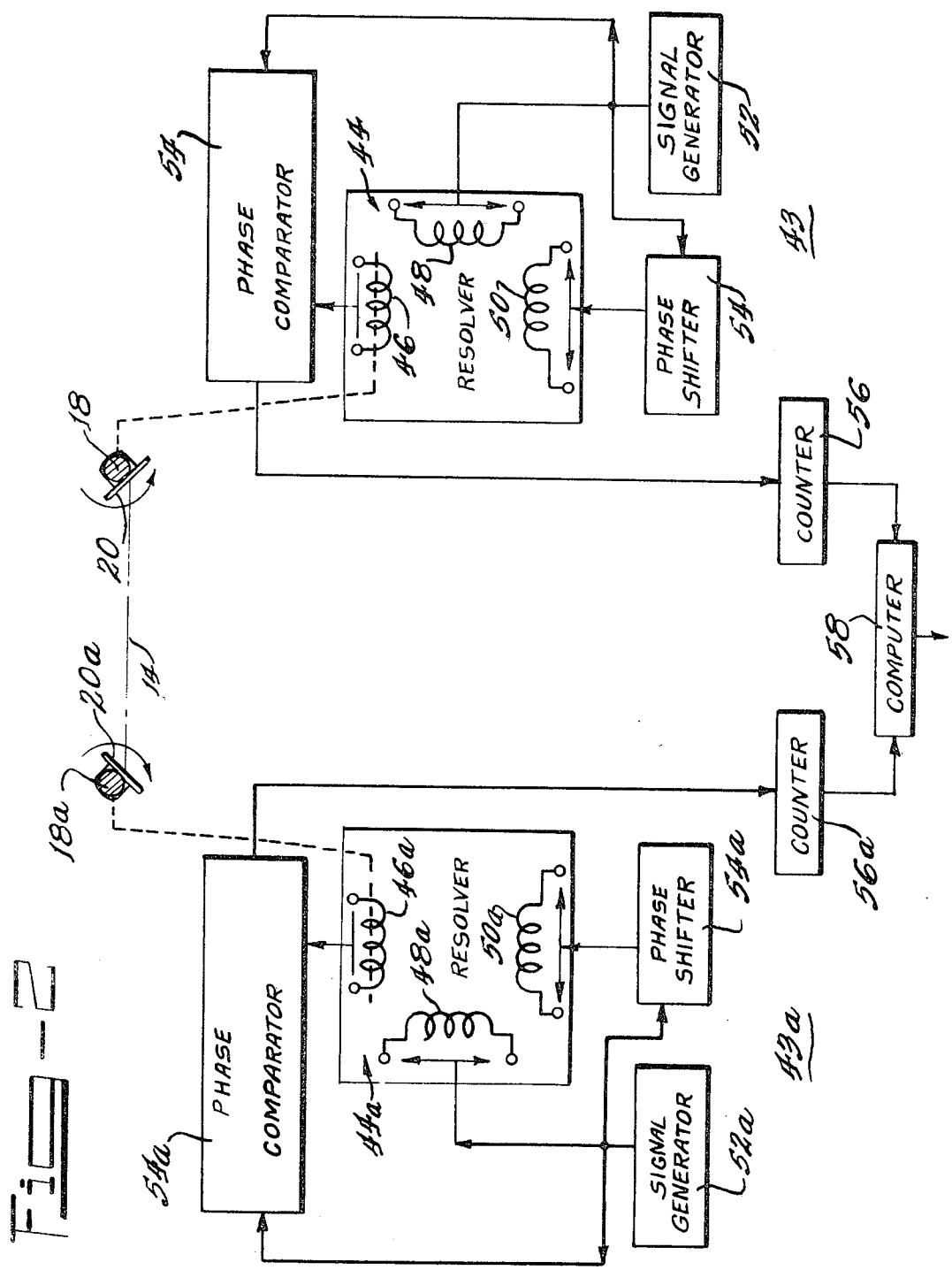

---

3,515,486
OPTICAL RANGING DEVICE
Robert H. Vonderohe, Downers Grove, Ill., John H. Doede, Shorewood, Minn., and Carl W. Lindenmeyer, Aurora, Ill., assignors to the United States of America as represented by the United States Atomic Energy Commission
Filed Nov. 22, 1967, Ser. No. 685,178
Int. Cl. G01b 11/27
U.S. Cl. 356—152           9 Claims

ABSTRACT OF THE DISCLOSURE

A CW laser transmits a collimated light beam of circular cross section along a reference line to a flat rotatable mirror which reflects the beam to a curved mirror located at an object point. The curved mirror reflects the collimated light with an elliptical cross section back along its transmitted path to a beam splitter located intermediate the flat mirror and the laser along the reference line. The beam splitter divides the reflected elliptical light into two beams whose intensities are proportional to deviation of the reflected elliptical light from the reference line. Differential light responsive means derives a signal from the dual beam output from the beam splitter to drive the rotatable flat mirror and effect axial coincidence between transmitted and reflected light. A resolver and phase comparator determine the angular rotational position of the flat mirror to provide a measure of the spatial position of the object point relative to the reference axis.

---

CONTRACTUAL ORIGIN OF THE INVENTION

The invention described herein was made in the course of, or under, a contract with the United States Atomic Energy Commission.

BACKGROUND OF THE INVENTION

This invention relates to ranging devices and more particularly to an optical ranging device using collimated light.

Ranging devices are employed to determine the location of a specific point or object with respect to a reference system. These devices may be mechanical, electrical, optical or combinations thereof. One specific use for ranging devices is in conjunction with experiments in high-energy physics. The end product of many of these experiments is a bubble chamber photograph which is generally scanned, and if certain information is found, catalogued or referenced.

Obviously, the accuracy of the information derived from the photographs is dependent upon the means by which the photographs are catalogued or referenced. It is the principal object of this invention to provide an extremely accurate optical ranging device.

SUMMARY OF THE INVENTION

This invention comprises means for generating and transmitting a collimated beam of light along a reference line. Flat rotatable mirrors located at specific points on the reference line reflect the light beam to an object point spaced therefrom. A curved mirror at the object point reflects the light beam back to the flat mirrors and then along the reference line. A combination of beam splitters and photomultipliers detect any deviation from the reference line of the light reflected from the object point and the signal therefrom is used to rotate the flat mirrors until a null deviation between the light reflected from the object point and the reference line is obtained. Means are provided to measure the angular rotation of the mirrors necessary to produce the null deviation, which angular rotation is a measure of the spatial position of the object point with respect to the reference line.

BRIEF DESCRIPTION OF THE DRAWING

FIG. 1 is a schematic of an apparatus for the practice of the present invention.
FIG. 2 is a detailed schematic of the readout device of the apparatus of FIG. 1.
FIG. 3 is an enlarged cross-sectional view of the beam splitter in FIG. 1.

DESCRIPTION OF THE PREFERRED EMBODIMENT

In FIG. 1, an object point 10 is located on a projection area 12. A reference line 14 is located adjacent projection area 12 and the apparatus of the present invention determines the spatial relationship of point 10 with respect to the reference line 14. It is apparent from FIG. 1 that the apparatus of the present invention comprises two identical sets of equipment. For purposes of clarity and ease of understanding, the following description will be limited to one set of equipment, it being understood that the other set, designated by the subscript $a$, is identical thereto and operates in a like manner.

A laser 15 is mounted with respect to the reference line 14 so as to generate therealong a collimated beam of light 16 circular in cross section. A shaft 18 is located a predetermined distance from laser 15 along reference line 14 and has a flat mirror 20 attached thereto to rotate therewith. The shaft 18 and mirror 20 are mounted so that mirror 20 reflects light beam 16 from laser 15 onto projection area 12 in the direction of object point 10.

A movable curved reflector 22 is disposed on the projection area 12. The curved reflector 22 is a right circular cylinder with transparent top and bottom surfaces which are marked with cross hairs 24. The cross hairs 24 are located on the top and bottom surfaces of the curved reflector 22 at the center thereof so that a beam of light striking the perimeter of the reflector normal thereto would pass through the center of the cross hairs if not reflected. The perimeter 23 of the reflector 22 is coated with a reflecting material to reflect light incident thereon.

A beam splitter 26 is wedge-shaped and, as shown in FIG. 3, has a circular hole 27 therethrough of a diameter sufficient to admit the light beam 16 from laser 15. The beam splitter 26 has silvered sides 28 and is mounted with respect to reference line 14 so that the beam 16 from laser 15 passes through hole 27. Two photomultipliers 30 and 32 are positioned on either side of the beam splitter 26 to detect light reflected from beam splitter 26. The output of each photomultiplier 30 and 32 is fed to a differential amplifier 38. The output of differential amplifier 38 is fed via a power amplifier 40 to a motor 42 which is coupled to shaft 18 to cause rotation thereof.

In operation, the laser 15 produces and transmits a collimated light beam 16 along reference line 14 through the hole 27 in beam splitter 26 to the flat mirror 20 mounted on shaft 18. Mirror 20 reflects light beam 16 onto projection area 12. The reflector 22 is moved to intercept the light beam 16 which is reflected onto the projection area 12. The reflector 22 is then positioned so that the intersection of cross hairs 24 is directly over object point 10. The silvered perimeter 23 of reflector 22 reflects the light beam back to the mirror 20 and back along reference line 14 to the beam splitter 26. As the silvered perimeter 23 of reflector 22 is curved, the reflected beam 25 will be elliptical in cross section rather than circular. The elliptical reflected light beam 25 due to its enlarged cross section will not pass entirely through the hole 27 in beam splitter 26 and a portion thereof will be split and reflected by the silvered sides 28 of the beam splitter to the associated photomultipliers 30 and 32. The output of each of the photomultipliers 30 and 32 is a voltage which is proportional to the integrated intensity of light striking the photomultipliers.

The differential amplifier 38 compares the outputs of the photomultipliers 30 and 32 and produces an output signal therefrom with a polarity indicative of any inequality in outputs from photomultipliers 30 and 32. The output from the amplifier 38 drives the motor 42 to rotate shaft 18 in a direction to achieve axial coincidence of the elliptical reflected beam 25 with the reference line 14, at which time the light reflected by sides 28 of beam splitter 26 to the associated photomultipliers 30 and 32 is equal in intensity. Coincidence or null deviation of the elliptically reflected beam 25 with reference line 14 can only occur if beam 16 strikes the perimeter 23 of reflector 22 normal thereto. But, as stated previously, a beam striking the perimeter 23 of reflector 22 normal thereto would pass through cross hairs 24 if the perimeter were not silvered. Thus, with the cross hairs 24 positioned over object point 10 and the elliptical reflected beam 25 in axial coincidence with the reference line 14, the angular rotational position of shaft 18 is a measure of the angle formed between the reference line and a line drawn between the object point and the shaft. The aforementioned angle is determined by the readout apparatus 43.

To read out the angular rotational position of shaft 18 and determine the position of point 10 with respect to the reference line 14, the apparatus 43 shown in detail in FIG. 2 is used.

A resolver 44 has its rotor 46 connected to rotate with shaft 18. The resolver 44 has stator windings 48 and 50 that are wound in quadrature with respect to each other. The output of a signal generator 52 excites one of the stator windings (for purposes of illustration, stator winding 48). The output of the signal generator 52 also excites the other stator winding 50 after being passed through a phase shifter 54 wherein the phase of the exciting signal is shifted 90 electrical degrees. The induced output signal of the rotor winding 46 is responsive to the angular position of the rotor with respect to the stator windings 48 and 50. A phase comparator 54 has two inputs, one connected to the output of the rotor winding 46 and the other to the output of the signal generator 52. The output from phase comparator 54 is fed to a high-frequency counter 56 and the output therefrom is fed to a computer 58.

In operation, shaft 18 rotates as explained above until an axial coincidence between the elliptical reflected beam 25 and the reference line 14 is achieved. As shaft 18 rotates, the rotor 46 of resolver 44 rotates therewith so that after shaft 18 reaches its final position, rotor 46 has usually changed its angular position with respect to stator windings 48 and 50. The signal which is induced in rotor winding 46 by the presence of a signal in stator windings 48 and 50 is phase dependent upon the angular rotational relationship between the rotor windings and the stator windings. Phase comparator 54 compares the phases of the signals from the rotor winding 46 and the signal generator 52 to produce an output signal which is phase dependent upon the angular rotational position of shaft 18. The output signal from phase comparator 54 is fed to a high speed counter 56 which counts during the time that the signal from the phase comparator is positive. The output from counter 56 is then also a measure of the angular position of shaft 18 and is fed to a computer 58 which is programmed to translate the signal from counter 56 to an angle value. The angle value determined by computer 58 is the angle formed between the reference line 14 and a line drawn from object point 10 to shaft 18.

This information is duplicated by the series "a" equipment to obtain a second angle between reference line 14 and a line drawn from object point 10 to shaft 18a. The two angles thus determined in combination with the known distance between shafts 18 and 18a permit triangulation of point 10 with respect to the reference line 14.

Using the preferred embodiment of the device as described above, a high degree of precision is attainable. The accuracy of the position of object point 10 is a function of the distance from flat mirrors 18 and 18a and to the object point. When a high-frequency counter, one which varies from 0 to 100,000 counts for a 45-degree rotation of shaft 18, is used for counter 56, accuracies of ±0.00113 inch for a distance of 3 feet from rotatable shafts 18 and 18a to object point 10 and ±0.000377 inch for 1 foot from shafts 18 and 18a to the object point are obtainable.

While the above-described apparatus is preferred, the angle formed between object point 10 and reference line 14 at shaft 18 can be determined in another manner. Motor 42 can be operated to drive shaft 18 at a constant speed. Two null signals from differential amplifier 38 will occur for each complete rotation of shaft 18 and mirror 20. One null will occur as hereinbefore described when the reflected elliptical beam 25 is coincident with beam 16. The second null will occur when mirror 20 is normal to reference line 14 and beam 16 is reflected back along the reference line. The output of differential amplifier 38 may be recorded and the time interval between the two null signals ascertained. This time interval is then a measure of the angular position of reflector 22 with respect to reference line 14.

It will be understood that the invention is not to be limited to the details given herein but that it may be modified within the scope of the appended claims.

The embodiments of the invention in which an exclusive property or privilege is claimed are defined as follows:

1. An apparatus for determining the spatial relationship between a reference line and an object point spaced therefrom comprising:
    (a) means for generating and transmitting a light beam along the reference line,
    (b) a first rotatable mirror on the reference line for reflecting the light beam to the object point,
    (c) means at the object point for reflecting the light beam back along the reference line via the first rotatable mirror,
    (d) first means for detecting deviation from the reference line of the beam reflected from the object point via the first rotatable mirror,
    (e) first means responsive to the first detecting means for rotating the first rotatable mirror to produce a null deviation between the reference line and the beam reflected from the object point via the first rotatable mirror, and
    (f) first means for measuring the angle of rotation of the first rotatable mirror as a measure of the spatial relationship between the object point and the reference line.

2. The apparatus of claim 1 further including:
    (a) a second rotatable mirror on the reference line for reflecting the light beam to the object point,
    (b) means at the object point for reflecting the light beam back along the reference line via the second rotatable mirror,
    (c) second means for detecting deviation from the reference line of the beam reflected from the object point via the second rotatable mirror,
    (d) second means responsive to the second detecting means for rotating the second rotatable mirror to produce a null deviation between the reference line and the beam reflected from the object point via the second rotatable mirror, and (e) second means for measuring the angle of rotation of the second rotatable mirror.

3. The apparatus of claim 2 wherein the light-generating means produces a collimated beam circular in cross section and the reflecting means at the object point comprises a curved reflecting surface so that light reflected therefrom is elliptical in cross section.

4. The apparatus of claim 3 wherein the means for detecting deviation of the elliptical reflected beams from the reference line comprises means for splitting each of the elliptical reflected beams into first and second signals which are intensity dependent upon deviation of the elliptical reflected beam from the reference line, and means for comparing said first and second signals, said comparing means being adapted to produce a signal indicative of the extent and direction of deviation of the elliptical reflected beam from the reference line.

5. The apparatus of claim 4 wherein the means for rotating the rotatable mirrors each comprise a motor and a shaft driven by the motor in communication with the rotatable mirror, said motor being activated by the signal produced by the comparing means.

6. The apparatus of claim 5 wherein the means for measuring the angle of rotation of the rotatable mirror each comprise a resolver having a rotor attached to the shaft in communication with the rotatable mirror, a stator with a pair of quadrature-wound windings, means for generating a pair of reference signals in phase quadrature with respect to each other and exciting each of said stator windings with one of the reference signals to induce in said rotor a signal phase dependent upon the rotational position of the shaft, and means for comparing the phases of the signal in the rotor and one of the reference signals.

7. The apparatus of claim 6 and further comprising a counter, said counter being activated when a signal from the means for comparing the phases of the signal in the rotor and one of the reference signals is positive and said counter being deactivated when said signal from the comparing means is negative.

8. The apparatus of claim 6 wherein the means for splitting the elliptical reflected beam each comprise a wedge having silvered slanted sides and a hole of sufficient diameter to admit the collimated beam circular in cross section therethrough, said hole extending from the knife-edge to the back of said wedge and said wedge being positioned along said reference line.

9. The apparatus of claim 7 wherein the means for producing a collimated beam of light circular in cross section is a continuous wave laser.

References Cited

UNITED STATES PATENTS

| | | | |
|---|---|---|---|
| 3,381,569 | 5/1968 | Hatcher | 356—152 XR |
| 3,432,240 | 3/1969 | Jackson | 356—152 |
| 3,435,744 | 4/1969 | Stimson. | |

RODNEY D. BENNETT, Primary Examiner

J. P. MORRIS, Assistant Examiner